United States Patent [19]
Palamara

[11] Patent Number: 5,879,427
[45] Date of Patent: Mar. 9, 1999

[54] BUSHING ASSEMBLIES FOR FIBER FORMING

[75] Inventor: Eugene J. Palamara, Butler, Pa.

[73] Assignee: PPG Industries, Inc., Pittsburgh, Pa.

[21] Appl. No.: 951,413

[22] Filed: Oct. 16, 1997

[51] Int. Cl.[6] .............................. C03B 5/435; F27B 7/34
[52] U.S. Cl. .......................... 65/499; 65/374.13; 65/492; 65/493; 65/495; 65/DIG. 4
[58] Field of Search .................. 65/374.13, 492, 65493, 495, 499, DIG. 4

[56] References Cited

U.S. PATENT DOCUMENTS

| | | | |
|---|---|---|---|
| 3,164,457 | 1/1965 | Mitchell et al. | 65/495 |
| 3,492,104 | 1/1970 | Glaser | 65/495 |
| 3,600,146 | 8/1971 | Jensen | 65/11 |
| 3,685,978 | 8/1972 | Hansen et al. | 65/1 |
| 3,837,823 | 9/1974 | Shealy | 65/493 |
| 3,859,070 | 1/1975 | Slonaker | 65/1 |
| 3,994,707 | 11/1976 | Newing, Jr. et al. | 65/26 |
| 4,167,403 | 9/1979 | Coggin | 65/493 |
| 4,382,811 | 5/1983 | Luscher et al. | 65/374.11 |
| 4,566,888 | 1/1986 | Schaefer | 65/493 |
| 4,846,865 | 7/1989 | Hinze | 65/1 |
| 4,957,525 | 9/1990 | Gaertner et al. | 65/1 |
| 5,110,333 | 5/1992 | McCormick | 65/492 |
| 5,147,431 | 9/1992 | Gaertner | 65/1 |
| 5,312,470 | 5/1994 | O'Brien-Bernini et al. | 65/12 |

FOREIGN PATENT DOCUMENTS

| | | | |
|---|---|---|---|
| 0 381 179 | 8/1990 | European Pat. Off. | |
| 910538 | 3/1982 | U.S.S.R. | 65/492 |

OTHER PUBLICATIONS

K. Loewenstein, *The Manufacturing Technology of Continuous Glass Fibres*, (3d Ed. 1993) at pp. 25–27, 31–36, 47–103 (Sections 4.5–4.6), 122–126, 135–141, 166–194, 237 291 (Chapter 6).

*Encyclopedia of Polymer Science and Technology*, vol. 6, (1967) at pp. 505–712.

R. Stevens, "Engineering Properties of Zirconia", *Engineered Materials Handbook®, Ceramics and Glasses*, vol. 4, pp. 775–786.

D. W. Richerson, *Modern Ceramic Engineering Properties, Processing, and Use in Design*, Marcel Dekker, Inc., (1982) pp. 32–36, 254–258.

*Webster's New Collegiate Dictionary*, G. & C. Merriam Co., 1977, p. 460.

"Tech–Report, METCO 204NS YTTRIA Stabilized Zirconia Powder", a technical bulletin of Metco Perkin–Elmer, (Jul. 1, 1985), Section 1b, pp. 1–6.

"Fiberfrax Duraboard™ LD, Product Specifications", a technical bulletin of Carborundum Resistant Materials Company, (1980), Form C739–D, pp. 1–2.

"Principal Characteristics of Fiberfrax Products", a technical bulletin of Carborundum Resistant Materials Company, (1981), Form C732–B, pp. 1–4.

"Fiberfrax Duraboard™ 60, Product Specifications", a technical bulletin of carborundum Resistant Materials Company, (1983), Form C739–F, pp. 1–2.

"Fiberfrax Duraboard 2600, Product Specifications", a technical bulletin of Carborundum Resistant Materials Company, (1982), Form C739–G, pp. 1–2.

"Fiberfrax GH Board, Product Specifications", a technical bulletin of Carborundum Resistant Materials Company, (1979), Form C739–B, pp. 1–2.

"Fiberfrax Duraboard 3000, Product Specifications", a technical bulletin of Carborundum Resistant Materials Company, (1982), Form C739–H, pp. 1–2.

"Fiberfrax Duraboard™ HD, Product Specifications", a technical bulletin of Carborundum Resistant Materials Company, (1980), Form C739–A, pp. 1–2.

"Fiberfrax Duraboard™ AB, Product Specifications", a technical bulletin of Carborundum Resistant Materials Company, (1980), Form C739–E, pp. 1–2.

"Fiberfrax Hot Board, Product Specifications", a technical bulletin of Carborundum Resistant Materials Company, (1979), Form C739–C, pp. 1–2.

"Representative Fiberfrax Applications", a technical bulletin of Carborundum Resistant Materials Company, (1981), Form C732–C, pp. 1–4.

"Fiberfrax® Ceramic Fiber Insulations", a technical bulletin of Carborundum Resistant Materials Company, (1982), Form C–719.

"Fiberfrax® Asbestos–Free Textile Products", a technical bulletin of Carborundum Resistant Materials Company, (1982), Form C–748.

"Principal Characteristics of Fiberfrax products", a technical bulletin of carborundum resistant Materials Company, Form A2301–3/2.

"Fiberglass Thermal Spray Masking Tapes", a technical bulletin of Fluorocarbon T&F Division.

"Metco 143 Zirconia, Titania, YTTRIA Composite Powder", a technical bulletin of Metco, Inc., (Oct. 26, 1984).

"Platinum: Metals Properties and Its Applications", a technical bulletin of International Nickel Company, (1968), pp. 3, 11.

*Primary Examiner*—Peter Chin
*Assistant Examiner*—Michael P. Colaianni
*Attorney, Agent, or Firm*—Ann Marie Cannoni

[57]  ABSTRACT

A bushing assembly for forming fibers from a supply of molten fiberizable material has: (a) a bushing block having an insulating body with a bore extending therethrough and (b) an electrically conductive bushing positioned adjacent to the bushing block to receive molten fiberizable material from the bore. The bushing includes a flange having bonded to an upper surface thereof a primary layer of an electrically insulating material with a bulk density of greater than 2.0 grams per cubic centimeter. The electrically insulating material is positioned adjacent to the liner on the lower surface of the body of the bushing block and is in contact with the molten fiberizable material.

21 Claims, 5 Drawing Sheets

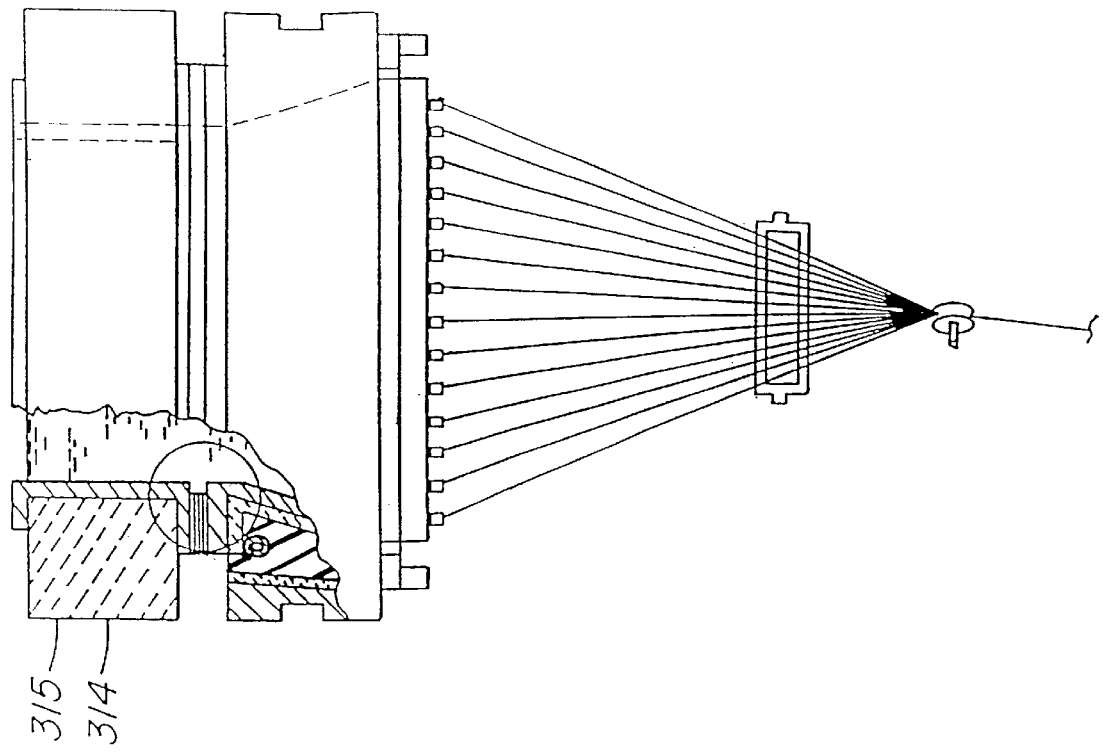
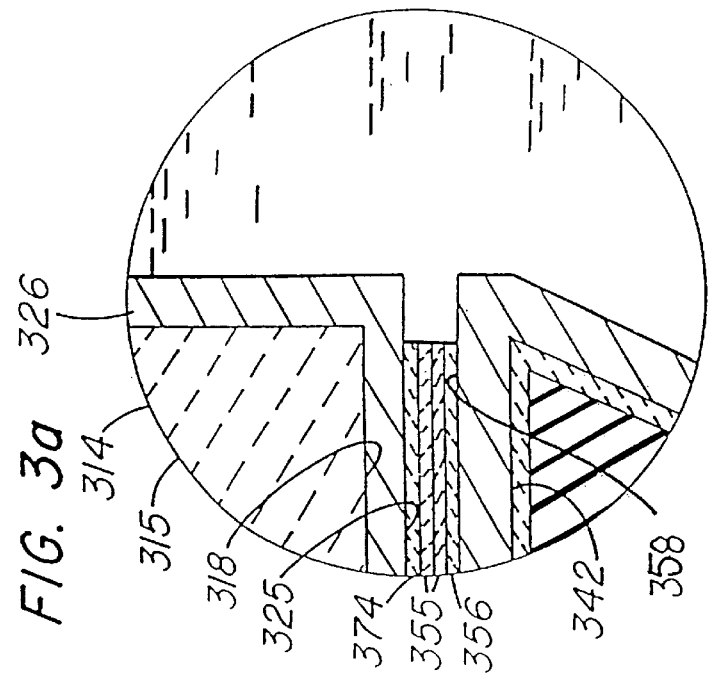

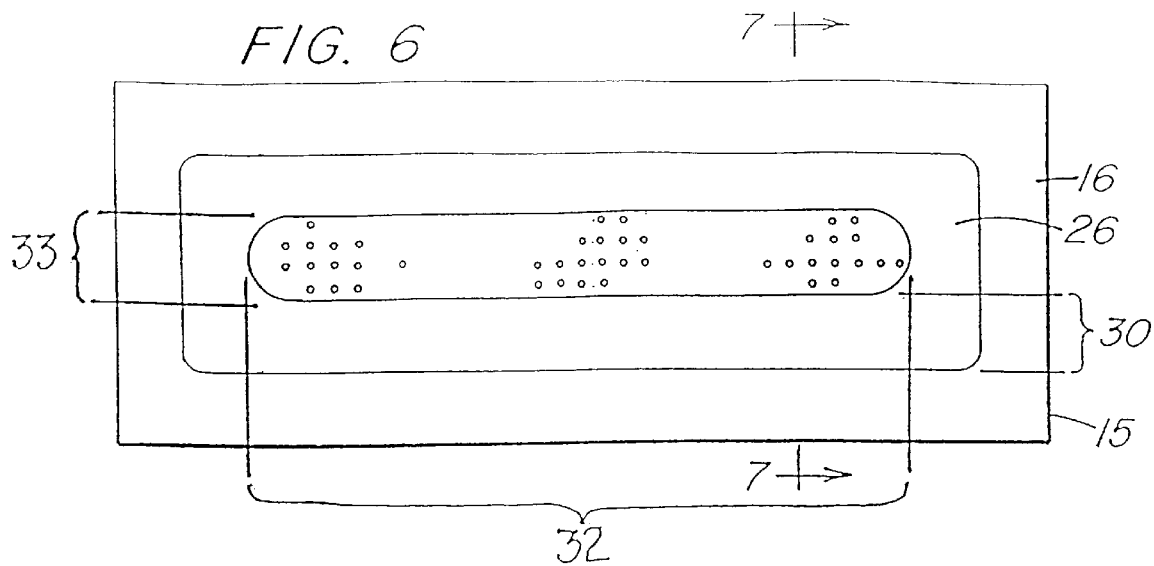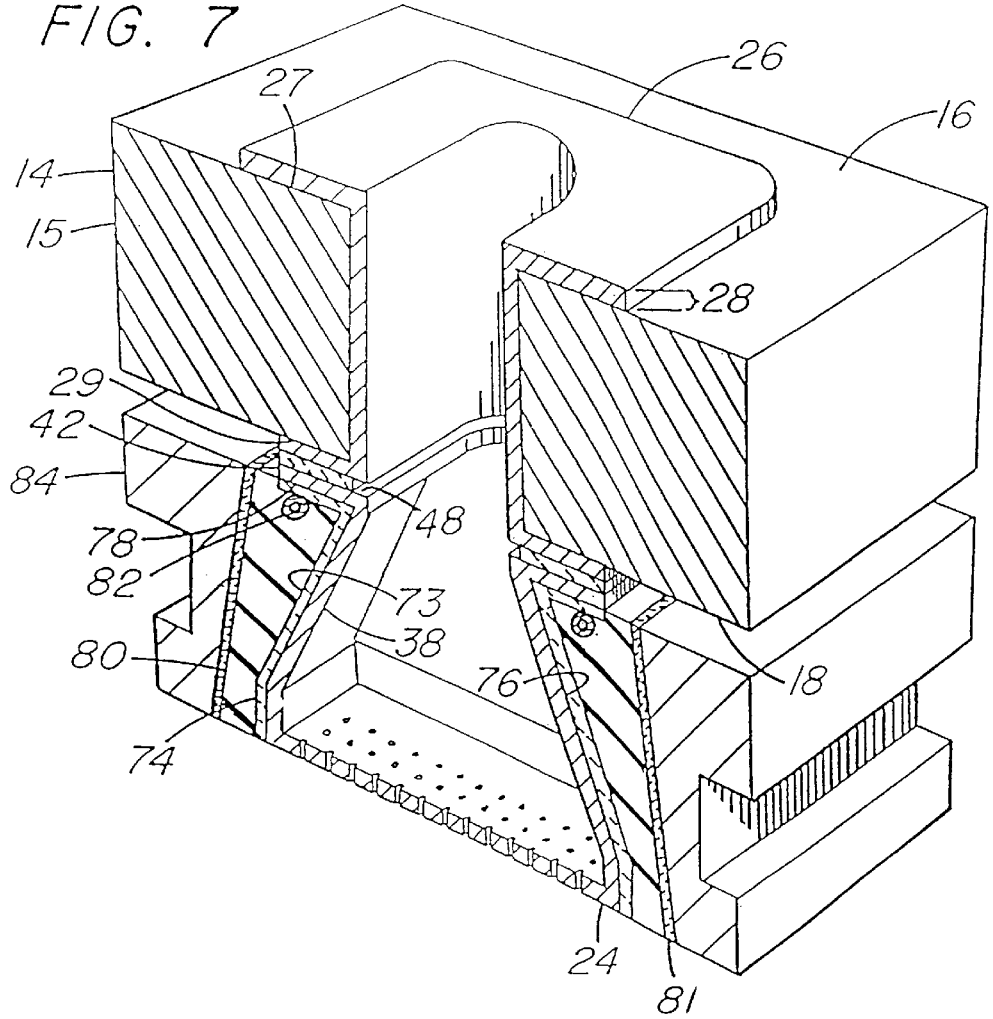

BUSHING ASSEMBLIES FOR FIBER FORMING

FIELD OF THE INVENTION

The present invention relates to a bushing assembly for forming fibers and, more particularly, to a bushing assembly including a metal bushing having a flange with a bonded layer of an electrically insulating material positioned adjacent to an electrically conductive liner on a bushing block of the assembly.

BACKGROUND OF THE INVENTION

Continuous glass fibers are formed by attenuating molten glass through apertures or tips at the bottom of a heated, metal container known as a "bushing". The bushing typically is surrounded by refractory materials to provide thermal and electrical insulation as well as mechanical support for the bushing.

The bushing assembly must withstand the corrosive operating environment provided by the molten glass contained therein and elevated operating temperatures without degradation of its electrical or mechanical components. These stringent requirements typically are met by fabricating the glass contacting portions of the bushing assembly from precious metals such as platinum or platinum alloys. However, the operating environment somewhat affects even these materials. Oxidation loss, volatilization, and migration of the precious metal into surrounding refractory materials as well as sagging or creep (high temperature deformation) of the bushing decrease bushing performance as well as shorten the useful life of the bushing assembly. Attempts to address such problems are discussed below.

U.S. Pat. No. 4,382,811 discloses a method of coating metal parts to be used in contact with molten glass with a composition consisting essentially of at least 60% by weight of chromium oxide, from 0 to 40% by weight of a nickel-based alloy and from 0 to 20% by weight of metal oxides (col. 1, lines 34–39). This patent does not discuss glass fiber forming apparatus.

European Patent Publication No. 0381179 discloses electrophoretic deposition of a ceramic coating on the non-glass contacting surfaces of a bushing for glass fiber production (page 2, col. 1, lines 24–28).

U.S. Pat. Nos. 3,685,978 and 3,859,070 disclose a bushing having a refractory coating on the exterior surfaces of the bushing, including the bottom surface of the bushing and the sidewalls, to prevent oxidation losses of the precious metal and reduce the tendency of the bushing to sag during use (col. 5, lines 17–27 and col. 6, lines 16–20 of the '978 patent; and col. 6, lines 58–69 and col. 8, lines 11–15 of the '070 patent). The coated bushing also has a high temperature insulating, fibrous material disposed about and in a touching relationship with the coating on the bushing except at the tip plate (col. 6, lines 20–26; col. 8, lines 15–24, respectively). The fibrous material is "used to insulate and allow for expansion of the bushing during service . . . " (col. 6, lines 23–24; col. 8, lines 19–20, respectively). The inside of the bushing also may be coated with a refractory material resistant to glass attack to strengthen the structure and prevent oxidation losses (col. 6, lines 58–63; col. 8, lines 42–46, respectively). Neither of these references discloses a bushing having a flange.

U.S. Pat. No. 4,846,865 discloses a bushing having a ceramic coating such as yttrium oxide-stabilized zirconium oxide "applied on the outwardly disposed surfaces, or portions of the bushing, that is the nonglass contacting portions of the bushing . . . " (col. 3, lines 23–26). The bushing is heated to a temperature of about 2732° F. for about six hours to further sinter the coating to enhance bonding of the coating to the precious metal (col. 4, lines 45–53).

Degradation of the refractory material surrounding the bushing, contributing to localized electrical resistance changes in the bushing and non-uniform heating of the molten glass within it, is a particularly troublesome problem affecting bushing longevity and productivity that is inadequately addressed by the foregoing references.

In a direct-melt operation, the flanged bushing can be positioned directly below a metal-lined bore in an insulating block or "bushing block". Electrical isolation is necessary to prevent electrical contact between the bushing and the metal liner. Without electrical isolation, the electric current which heats the metal bushing would be diverted to heat the metal liner causing (1) disruption of temperature control of the bushing tip plate and (2) localized over-heating of the bushing assembly between the flange and the liner. Disruption of temperature control of the bushing tip plate can cause the temperature of the glass adjacent the tip plate to become non-uniform which contributes to fiber break-out during the attenuation process. As used herein, "break-out" means that one or more continuous fibers break during the attenuation process. Localized over-heating of the bushing due to an increase in resistive heating in the area of contact between the flange and the bushing block liner can cause glass leakage from between the flange and the liner. When glass leakage occurs, the attenuation process must be discontinued and the bushing replaced. Both break-outs and glass leakage result in lost production time, decreased production efficiency, and increased materials and maintenance costs.

To electrically isolate the bushing block liner from the flange, a low bulk density, fibrous, electrically insulating gasket material, such as FIBERFRAX 970 J insulating material[1], typically has been interposed between the flange and the liner. As used herein, "low bulk density" means insulating materials having a bulk density of less than about 1.0 gram per cubic centimeter (g/cc) and "high bulk density" means insulating materials having a bulk density greater than about 2.0 g/cc.

[1]FIBERFRAX 970 J is an aluminosilicate fiber-containing insulating material which is commercially available from The Carborundum Company of Niagara Falls, N.Y.

Low bulk density, fibrous electrically insulating materials are not desirable as gaskets in fiber forming operations because of their poor structural integrity. As used herein, "poor structural integrity" means that the insulating material is friable, easily crumbled or pulverized and "good structural integrity" means that the insulating material resists crumbling or pulverization. See *Webster's New Collegiate Dictionary* (1977) at page 460, which is hereby incorporated by reference.

During installation of the bushing beneath the bushing block, irregularities on the surface of the bushing block liner can penetrate the low bulk density, fibrous, insulating gasket material and contact the bushing flange. During the fiber forming operation, contact between the metallic bushing block liner and bushing flange can disrupt the electric current directed through the bushing and thereby disrupt temperature control of the bushing tip plate resulting in non-uniform heating of the molten glass and increased break-outs. Typically, thick or multiple layers of low bulk density, fibrous insulating material have been interposed as a gasket between the bushing block liner and the bushing flange to prevent contact therebetween. As used herein, a "thick layer" of insulating gasket material has an average thickness greater than about 1.0 mm (0.040 inches) and a "thin layer" of insulating gasket material has an average thickness of less than about 0.5 mm (0.020 inches).

Also, a thick layer of low bulk density, fibrous, insulating gasket material between the bushing block liner and the bushing flange can create a void space or gap in which molten glass can accumulate. Chemical reactions occurring between the molten glass accumulated in the gap and the surrounding insulating gasket material can result in devitrification or crystallization of the molten glass into solid particles. Such particles, which are not bonded to the bushing block liner or the flange, can be eroded by and entrained in the adjacent flowing molten glass and contribute to break-out of the fibers. Also, the flowing molten glass can erode the low bulk density, fibrous, insulating material itself. Thick layers of the low bulk density, fibrous, insulating material increase the amount of surface area subjected to the erosive action of the molten glass.

Since poor production efficiency and production downtime due to fiber break-out and replacement of failed bushings results in costly waste of labor and materials, an electrically insulating material which has good structural integrity and resistance to erosion and chemical interaction with molten glass is needed for use in a bushing assembly as a gasket between the bushing flange and the metal liner on the bushing block.

SUMMARY OF THE INVENTION

The present invention provides a bushing assembly for forming fibers from a supply of molten fiberizable material, the bushing assembly comprising: (a) a bushing block comprising: (i) an insulating body having an upper surface, a lower surface, and a bore extending between a portion of the upper surface and a portion of the lower surface to define a passageway through the bushing block between the upper surface and the lower surface to permit the flow therethrough of a molten fiberizable material received from a supply; and (ii) an electrically conductive liner positioned upon a surface of the bore, a portion of the upper surface of the body adjacent to the bore, and a portion of the lower surface of the body adjacent to the bore; and (b) an electrically conductive bushing positioned adjacent to the lower surface of the body of the bushing block to receive the molten fiberizable material from the bore of the bushing block, the bushing comprising: (i) a bottom wall having a plurality of apertures to permit the flow therethrough of the molten fiberizable material; (ii) a sidewall extending upwardly from an edge of the bottom wall; and (iii) a flange extending generally perpendicularly from a top edge of the sidewall, a portion of an upper surface of the flange having a primary layer of an electrically insulating material bonded thereto, the bushing being positioned adjacent to the bushing block such that the layer of electrically insulating material bonded to the upper surface of the flange is positioned adjacent to the liner on the lower surface of the body of the bushing block and is in contact with the molten fiberizable material, the primary layer of electrically insulating material having a bulk density of greater than about 2.0 grams per cubic centimeter, the bushing assembly being essentially free of aluminosilicate fibers positioned between the liner on the lower surface of the body of the bushing block and the primary layer of electrically insulating material on the upper surface of the flange of the bushing.

Another aspect of the present invention is a bushing assembly for forming fibers from a supply of molten fiberizable material, the bushing assembly comprising: (a) a bushing block comprising: (i) an insulating body having an upper surface, a lower surface, and a bore extending between a portion of the upper surface and a portion of the lower surface to define a passageway through the bushing block between the upper surface and the lower surface to permit the flow therethrough of a molten fiberizable material received from a supply; and (ii) an electrically conductive liner positioned upon a surface of the bore, a portion of the upper surface of the body adjacent to the bore, and a portion of the lower surface of the body adjacent to the bore; and (b) an electrically conductive bushing positioned adjacent to the lower surface of the body of the bushing block to receive the molten fiberizable material from the bore of the bushing block, the bushing comprising: (i) a bottom wall having a plurality of apertures to permit the flow therethrough of the molten fiberizable material; (ii) a sidewall extending upwardly from an edge of the bottom wall; and (iii) a flange extending generally perpendicularly from a top edge of the sidewall, a portion of an upper surface of the flange having a primary layer of an electrically insulating material bonded thereto, the bushing being positioned adjacent to the bushing block such that the layer of electrically insulating material bonded to the upper surface of the flange is positioned adjacent to the liner on the lower surface of the body of the bushing block and is in contact with the molten fiberizable material, the primary layer of electrically insulating material having a bulk density greater than about 2.0 grams per cubic centimeter and being essentially free of aluminosilicate fibers.

Yet another aspect of the present invention is a bushing assembly for forming fibers from a supply of molten fiberizable material, the bushing assembly comprising: (a) a bushing block comprising: (i) an electrically insulating body having an upper surface, a lower surface, and a bore extending between a portion of the upper surface and a portion of the lower surface to define a passageway through the bushing block between the upper surface and the lower surface to permit the flow therethrough of a molten fiberizable material received from a supply; and (ii) an electrically conductive liner positioned upon a surface of the bore, a portion of the upper surface of the body adjacent to the bore, and a portion of the lower surface of the body adjacent to the bore; and (b) an electrically conductive bushing positioned adjacent to the lower surface of the body of the bushing block to receive the molten fiberizable material from the bore of the bushing block, the bushing comprising: (i) a bottom wall having a plurality of apertures to permit the flow therethrough of the molten fiberizable material; (ii) a sidewall extending upwardly from a edge of the bottom wall; and (iii) a flange extending generally perpendicularly from a top edge of the sidewall, a portion of an upper surface of the flange having a primary layer of an electrically insulating material bonded thereto, the bushing being positioned adjacent to the bushing block such that the layer of electrically insulating material bonded to the upper surface of the flange is positioned adjacent to the liner on the lower surface of the body of the bushing block and is in contact with the molten fiberizable material, the primary layer of electrically insulating material having a bulk density of greater than about 2.0 grams per cubic centimeter and comprising zirconium oxide which is at least partially stabilized with yttrium oxide, the bushing assembly being free of aluminosilicate fibers positioned between the liner on the lower surface of the body of the bushing block and the primary layer of electrically insulating material on the upper surface of the flange of the bushing.

Still another aspect of the present invention is a fiber forming apparatus comprising: (a) a supply of molten fiberizable material; (b) a bushing assembly positioned to received a molten fiberizable material from the supply, the bushing assembly comprising: (i) a bushing block comprising: (1) an insulating body having an upper surface, a lower surface, and a bore extending between a portion of the upper surface and a portion of the lower surface to define a passageway through the bushing block between the upper surface and the lower surface to permit the flow therethrough of the molten fiberizable material received from the supply; and (2) an electrically conductive liner positioned upon a surface of the bore, a portion of the upper surface of the body adjacent the bore, and a portion of the lower surface of the body adjacent to the bore; and (ii) an electrically conductive bushing positioned adjacent to the lower surface of the body of the bushing block to receive the molten fiberizable material from the bore of the bushing block, the bushing comprising: (1) a bottom wall having a plurality of apertures to permit the flow therethrough of the molten fiberizable material; (2) a sidewall extending upwardly from a edge of the bottom wall; and (3) a flange extending generally perpendicularly from a top edge of the sidewall, a portion of an upper surface of the flange having a primary layer of an electrically insulating material bonded thereto, the bushing being positioned adjacent to the bushing block such that the primary layer of electrically insulating material bonded to the upper surface of the flange is positioned adjacent to the liner on the lower surface of the body of the bushing block and is in contact with the molten fiberizable material, the primary layer of electrically insulating material having a bulk density of greater than about 2.0 grams per cubic centimeter, the bushing assembly being essentially free of aluminosilicate fibers positioned between the liner on the lower surface of the body of the bushing block and the primary layer of electrically insulating material on the upper surface of the flange of the bushing; and (c) a device for attenuating the molten fiberizable material through the plurality of apertures on the bottom wall of the bushing to form essentially continuous fibers from the molten fiberizable material.

Another aspect of the present invention is a method of electrically insulating (1) an electrically conductive bushing from (2) an electrically conductive liner of a bushing block, the method comprising the steps of: (a) providing a bushing block comprising an insulating body having an electrically conductive liner on a lower surface of the body; (b) positioning an electrically conductive bushing adjacent to the bushing block, the bushing comprising a flange having a layer of an electrically insulating material having a bulk density of greater than about 2.0 grams per cubic centimeter bonded to an upper surface of the flange wherein the layer of electrically insulating material bonded to the flange is positioned proximate the liner on the lower surface of the body of the bushing block to electrically insulate the bushing from the electrically conductive liner.

BRIEF DESCRIPTION OF THE DRAWINGS

The foregoing summary and the following detailed description of the preferred embodiments will be better understood when read in conjunction with the appended drawings. In the drawings:

FIG. 3 is a schematic front elevational view of an alternative embodiment of a bushing assembly of a fiber forming apparatus, according to the present invention;

FIG. 3a is an enlargement of a portion of the alternative embodiment of the bushing assembly of FIG. 3, partially broken away;

FIG. 6 is a top plan view of a bushing assembly according to the present invention; and FIG. 7 is a cross-sectional view of the bushing of FIG. 6, taken along lines 7—7 of FIG. 6.

DETAILED DESCRIPTION OF THE PREFERRED EMBODIMENTS

The bushing assembly of the present invention, advantageous in offering increased bushing longevity, reduced maintenance costs, reduced bushing replacement costs, and improved fiber quality and production efficiency, can be used in the formation of fibers from any fiberizable material in both direct-melt and marble-melt fiber forming operations, although it is used preferably in direct-melt forming operations. "Fiberizable material" means any material, natural or man-made, capable of being formed or drawn into essentially continuous fibers such as are disclosed in *The Encyclopedia of Polymer Science and Technology*, Vol. 6 (1967) at pages 505–712, which are hereby incorporated by reference.

Preferably, the bushing assembly is used to form glass fibers from fiberizable glass compositions. "Fiberizable glass compositions" means compositions based upon oxide compositions such as silicates selectively modified with other oxide and non-oxide compositions that are formable into essentially continuous fibers. Examples of fiberizable glass compositions useful herein include, but are not limited to, "E-glass" (which is preferred), "A-glass", "C-glass", "D-glass", "R-glass", "S-glass", and E-glass derivatives that are fluorine-free and/or boron-free. The formulations for these and other glass compositions are well known to those skilled in the art. If more information is needed, see K. Loewenstein, *The Manufacturing Technology of Glass Fibers*, (3rd. Ed. 1993) at pages 31–36, which are hereby incorporated by reference.

In the direct-melt process, raw batch ingredients are combined, melted, and homogenized in a glass melting furnace. The molten glass moves from the furnace through the forehearth and into the fiber forming apparatus where it is subsequently attenuated into continuous glass fibers. More detailed information on glass melting furnaces and forehearths can be found in *Loewenstein*, (3rd. Ed. 1993) at sections 4.5–4.6, which are hereby incorporated by reference.

Figure 1:
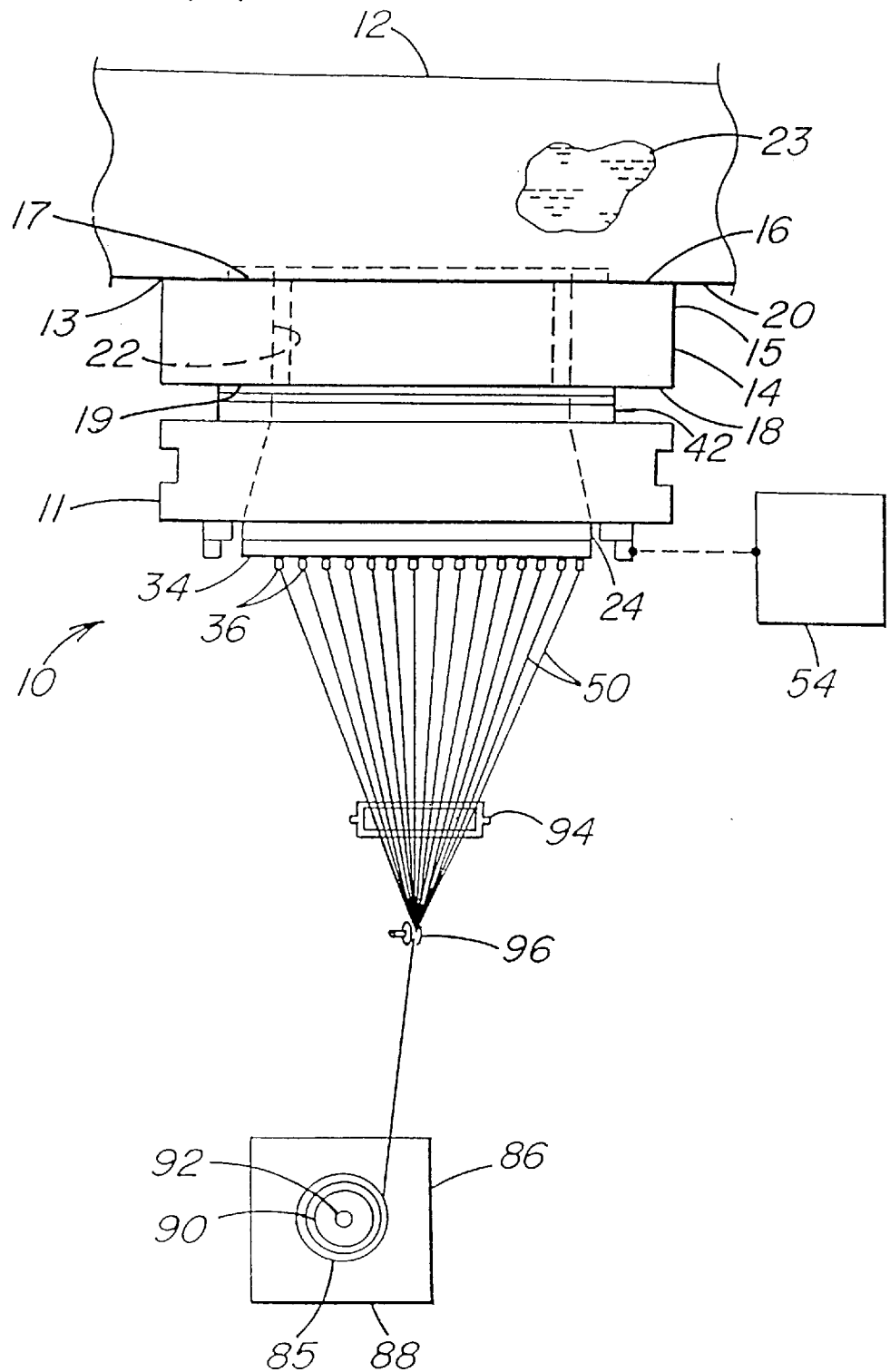
FIG. 1 is a schematic front elevational view of a fiber forming apparatus according to the present invention.

Referring to FIG. 1, there is shown a fiber forming apparatus, generally designated 10, comprising a bushing assembly 11 connected to a forehearth 12 by a bushing block 14. Due to the high temperatures associated with molten glass processing, the bushing block 14 comprises an insulating body 15 typically formed from a refractory ceramic material. Examples of such materials include but are not limited to: mullite, chromic oxide, zircon, and combinations and mixtures thereof.

The insulating body 15 has an upper surface 16, a lower surface 18 and a bore 22 (shown in phantom in FIG. 1) extending between a portion 17 of the upper surface 16 and a portion 19 of the lower surface 18. The upper surface 16 of the body 15 is connected to the floor 20 of the forehearth 12 such that the internal bore 22 through the bushing block 14 between the upper surface 16 and lower surface 18 of the body 15 is positioned to receive molten glass 23 from the forehearth 12. The bore 22 defines a passageway 21 (shown in FIG. 2) through the bushing block 14 between the upper surface 16 and the lower surface 18 of the body 15 that permits the molten glass 23 to flow from the forehearth 12 into a bushing 24 positioned adjacent to, and preferably in facing engagement with, the lower surface 18 of the body 15 of the bushing block 14.

The bore 22 can have any shape, but is preferably oval in cross-section. One skilled in the art will recognize that the dimensions of the bore 22 depend on the size and configuration of the bushing with which it will be used. For example, a bushing for forming approximately 400 individual fibers, each fiber having a 9-micron nominal diameter, can have the following dimensions: the length 32 of the bore 22 can range from about 12.7 centimeters (cm) (5 inches) to about 127 cm (50 inches) and its width 33 can range from about 2.5 cm (1 inch) to about 12.7 cm (5 inches). Preferably, the length 32 of the bore 22 ranges from about 25.4 cm (10 inches) to about 76.2 cm (30 inches) and its width 33 ranges from about 2.5 cm (1 inch) to about 7.6 cm (3 inches).

Figure 2:
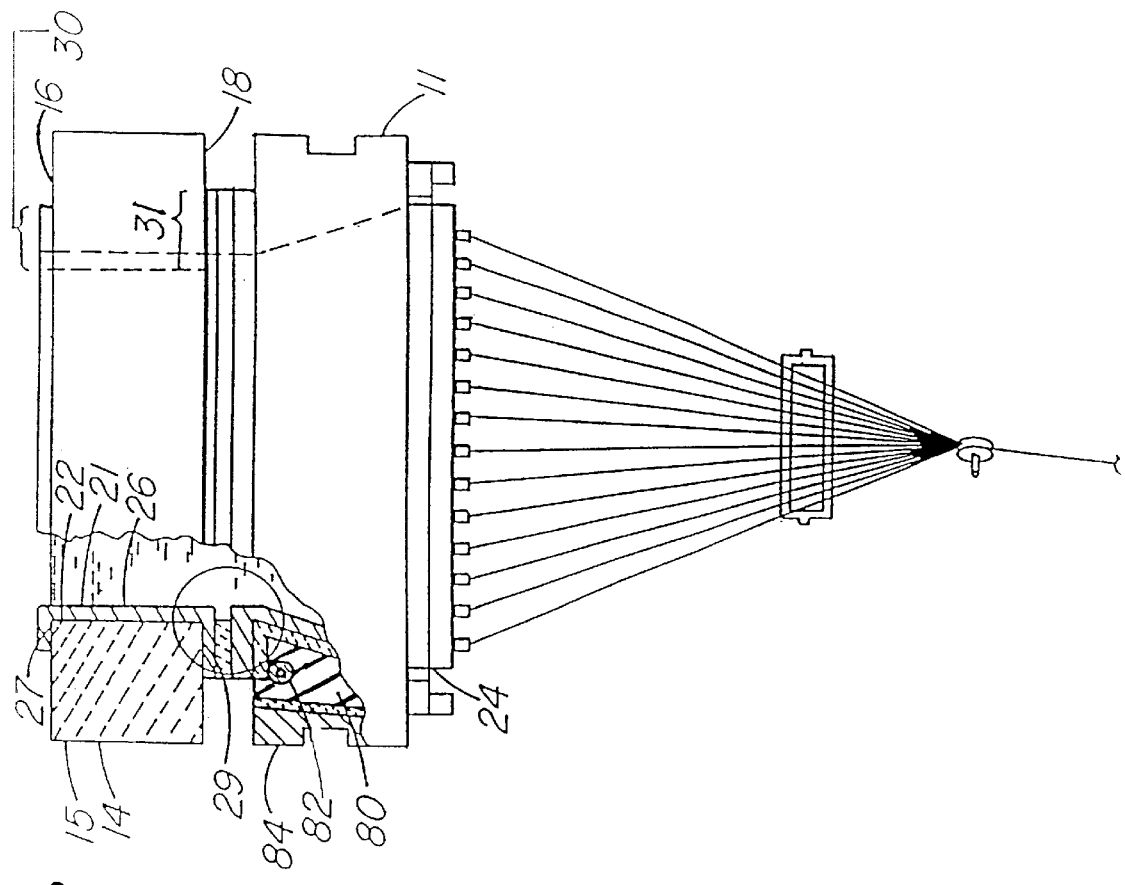
FIG. 2 is a schematic front elevational view of the bushing assembly of the fiber forming apparatus of FIG. 1, according to the present invention.
Figure 2A:
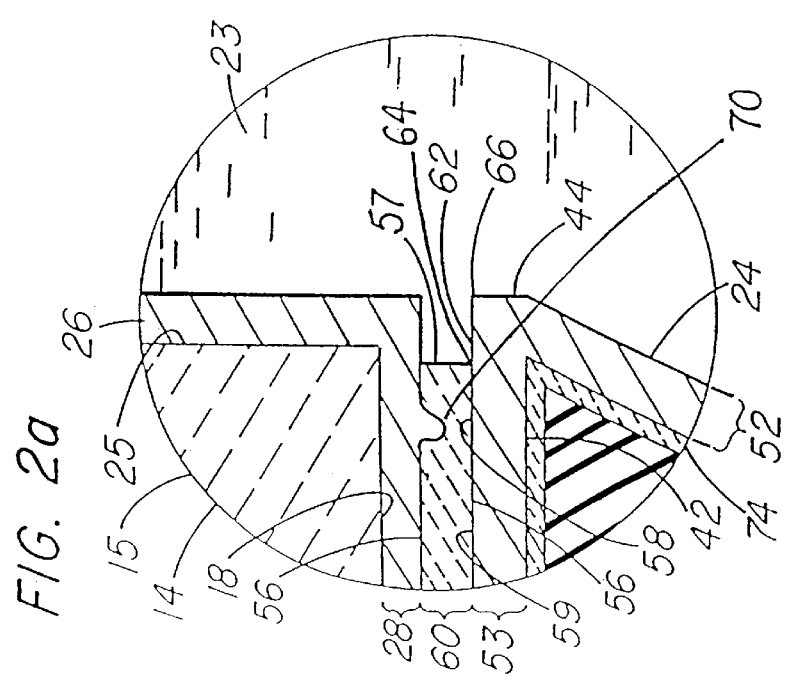
FIG. 2a is an enlargement of a portion of the bushing assembly of FIG. 2, partially broken away to show a layer of electrically insulating material bonded to a portion of the upper surface of the flange and interposed between the flange and the liner on the lower surface of the bushing block, according to the present invention.

Referring now to FIGS. 2 and 2a, since the refractory material that comprises the body 15 of the bushing block 14 is not completely resistant to the high temperature and corrosive effect of the molten glass 23 flowing through the bore 22, the bore 22 has a protective liner 26, preferably formed from a precious metal and more preferably a platinum-containing material, positioned upon a surface 25 of the bore 22, a portion 27 of the upper surface 16 of the body 15 adjacent the bore 22, and a portion 29 of the lower surface 18 of the body 15 adjacent the bore 22. As used herein, "platinum-containing material" means platinum or a platinum alloy. Non-limiting examples of platinum-containing materials are platinum-rhodium alloys, dispersion strengthened platinum alloys and dispersion strengthened platinum-rhodium alloys, which are preferred. For more information on useful platinum-containing materials, see *Loewenstein*, (3rd. Ed. 1993) at pages 122–126, which are hereby incorporated by reference.

Referring to FIGS. 2, 2a and 7, the thickness 28 of the liner 26 on the body 15 of the bushing block 14 can range from about 0.025 millimeters (mm) (0.001 inches) to about 0.76 mm (0.030 inches) and is preferably about 0.13 mm (0.005 inches) to about 0.38 mm (0.015 inches). As shown in FIG. 6, the width 30 of the liner 26 on the upper surface 16 of the body 15 can range from about 1.3 cm (0.5 inches) to about 5.1 cm (2.0 inches). As shown in FIG. 2, the width 31 of the liner 26 on the lower surface 18 of the body 15 can range from about 1.3 cm (0.5 inches) to about 5.1 cm (2.0 inches).

As shown in FIGS. 1 and 2, the bushing assembly 11 comprises an electrically conductive bushing 24 positioned adjacent to, and preferably in facing engagement with, the liner 26 on the lower surface 18 of the body 15 of the bushing block 14. The bushing 24 receives the molten glass 23 from the bore 22 of the bushing block 14 and conditions the glass to a uniform temperature of about 1000° C. to about 1570° C. prior to attenuation.

Figure 5:
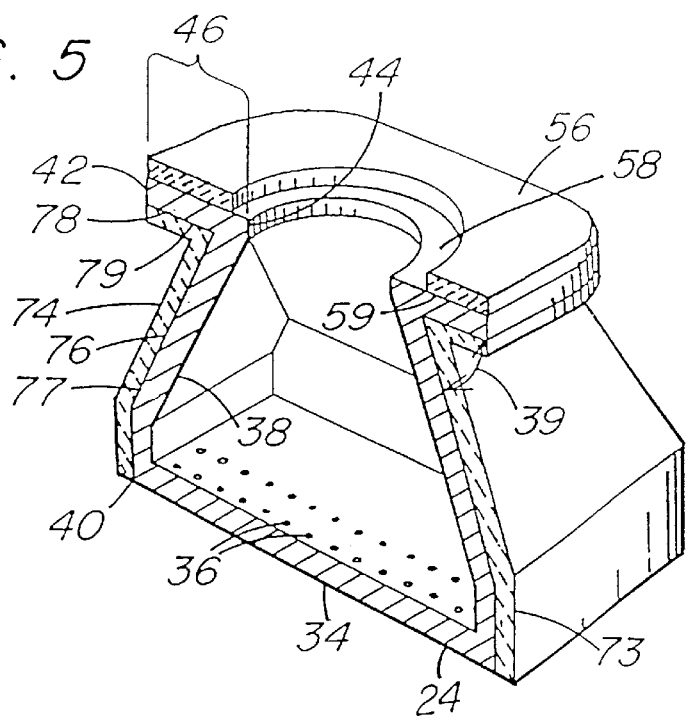
FIG. 5 is a cross-sectional view of the bushing of FIG. 4, taken along lines 5—5 of FIG. 4.

Referring to FIG. 5, the bushing 24 comprises a bottom wall 34 or tip plate having a plurality of apertures or bushing tips 36 to permit the flow of molten glass 23 therethrough, a sidewall 38 extending upwardly from an edge 40 of the bottom wall 34, and a flange 42 that extends generally perpendicularly from a top edge 44 of the sidewall 38.

The bushing 24 and the flange 42 are formed from an electrically conductive material, preferably a platinum-containing material such as is discussed above. One skilled in the art recognizes that the selection of the preferred platinum-containing material will depend on several factors, including the material's resistance to sagging or creep, stability of electrical properties and the configuration of the bushing itself. The thickness 52 (shown in FIG. 2a) of the bushing 24 can range from about 0.13 mm (0.005 inches) to about 1.5 mm (0.060 inches) and is preferably about 0.25 mm (0.010 inches) to about 0.76 mm (0.030 inches).

The bushing 24 is typically formed by joining together the bottom wall 34 and the sidewall 38 by welding. The flange 42 can be formed in any manner well known to those skilled in the art for forming a flange. For example, the flange 42 can be formed by welding a piece of platinum-containing material to the upper edge 44 of the sidewall 38 or it can be formed by bending the upper edge 44 of the sidewall 38 outwardly from the bushing 24. The angle 39 (shown in FIG. 5) between the flange 42 and the sidewall 38 can range from about 50° to about 100°.

The flange 42 is formed from a malleable, platinum-containing material (discussed above) to conform to the shape of the liner 26 on the lower surface 18 of the body 15 and preferably is generally flat. As used herein, "malleable" means capable of being shaped or formed. Referring to FIG. 2a, the thickness 53 of the flange 42 can range from about 0.13 mm (0.005 inches) to about 1.5 mm (0.060 inches) and is preferably about 0.51 mm (0.020 inches). The width 46 of the flange 42 (shown in FIG. 5) can range from about 1.3 cm (0.5 inches) to about 6.4 cm (2.5 inches) and is preferably about 1.9 cm (0.75 inches) to about 3.8 cm (1.5 inches).

Referring now to FIG. 1, the bottom wall 34 of the bushing 24 includes a plurality of bushing tips 36 through which the molten glass 23 is attenuated to form the continuous fibers 50. The diameter and number of the bushing tips 36 in the bushing 24 will depend in part on the desired diameter of the individual glass fibers to be formed and the number of fibers to be bundled together to form a strand. Typical fiber diameters range from about 5 microns to about 24 microns (typically designated "D" through "U"). For more information regarding fiber diameters and designations see *Loewenstein*, (3rd Ed., 1993) at pages 25–27, which are hereby incorporated by reference.

The bushing 24 is heated by connecting it to an electrical energy source 54, shown in FIG. 1. The temperature of the bushing 24 must be carefully regulated to maintain an essentially uniform glass melt temperature throughout the bottom wall 34 of the bushing 24 for fiber forming. Changes in the electrical performance of the bushing 24 due to dimensional changes, chemical reactions with the molten glass 23, or physical contact with other electrically conductive elements in the system can adversely affect the fiber forming operation, as previously discussed.

Referring to FIG. 2a, in the present invention the flange 42 of the bushing 24 is adjacent to, and preferably in facing engagement with, the liner 26 on the lower surface 18 of the body 15 of the bushing block 14. To prevent electrical contact between the flange 42 and the electrically conductive material of the liner 26, a portion 59 of the upper surface 58 of the flange 42 which is adjacent to the liner 26 on the bushing block 14 has bonded thereto a primary layer 56 of an electrically insulating material having a bulk density of greater than about 2.0 g/cc.

As used herein, bulk density (B) is defined by the following formula (I):

$$B=(D)/(v) \qquad (I)$$

where D is the dry weight of the sample and v is the total volume of the sample including voids and pores as is well known to those skilled in the art. D. Richerson, *Modern Ceramic Engineering: Properties Processing and Use in Design*, (1982) at pages 32–36, which are hereby incorporated by reference.

Bulk density can be calculated in different ways depending on the geometry of the sample to be measured. The bulk density of samples having simple geometry can be found by dividing the dry weight of the sample by the calculated volume of the sample. For example, if the sample is a rectangular bar the bulk density can be determined according to the following formula (II):

$$B=(D)/(w \times l \times h) \qquad (II)$$

where D is the dry weight of the sample, l is the length of the sample, w is the width of the sample, and h is the height of the sample. Richerson at p.33.

The bulk density of samples having complex geometry can be determined by measuring the dry weight (D), the suspended weight (S) and the wet weight (W) of the sample and calculating the bulk density using formula (III) given below. The weights D, S, and W can be determined by the following procedure. The weight of the dry sample is measured in air at a temperature of about 25° C., to determine the dry weight (D) of the sample. The sample is then immersed into water which is then is heated to a temperature of about 100° C. for about 5 hours. The water is then cooled for about 24 hours to a temperature of about 25° C. After cooling, the weight of the wet sample is measured while the sample is suspended in water to determine the suspended weight (S) of the sample. After removal from the water, the weight of the wet sample is measured in air at a temperature of about 25° C. to determine the wet weight (W) of the sample. The bulk density of the sample can then be determined according to formula (III):

$$B=(D)/(W-S) \qquad (III)$$

where D, W, and S are as defined above. See Richerson at pp. 33–36.

A low bulk density material having internal voids, porosity and poor structural integrity (as defined above) is not desirable for use as an insulating gasket material between the bushing flange 42 and the liner 26 of the bushing block 14 because of its low resistance to mechanical degradation and erosion. For example, it has been observed that irregularities 70 or protrusions on the surface of the liner 26 can penetrate a low bulk density, fibrous insulating gasket material, such as FIBERFRAX 970 J insulating material[1], and contact corresponding portions of the flange 42 thereby disrupting temperature control of the bushing 24 and causing non-uniform heating of the molten glass 23 contained therein. It has also been observed that low bulk density materials, such as FIBERFRAX 970 J insulating material, can be eroded by the flow of molten glass 23 and form particulates. Since low bulk density insulating materials typically are not bonded to either the flange 42 or the liner 26, the particulates are susceptible to erosion and subsequent entrainment in the molten glass flow which can contribute to break-outs during fiber formation.

FIBERFRAX 970J has a bulk density of 0.16 to about 0.19 g/cc (160–192 kilograms per cubic meter (kg/m³)) according to "Principal Characteristics of Fiberfrax Products" Form C732-B, 1981, p.3 available from The Carborundum Company of Niagara Falls, N.Y., which is hereby incorporated by reference.

To ameliorate the aforementioned problems caused by molten glass flow erosion of insulating material, in the present invention the primary layer 56 of electrically insulating material has a bulk density greater than about 2.0 g/cc and is bonded to a portion 59 of the upper surface 58 of the flange 42 of the bushing 24. Referring to FIG. 2a, the bushing 24 is positioned adjacent to the bushing block 14 such that the primary layer 56 of electrically insulating material is positioned adjacent to the liner 26 on the lower surface 18 of the body 15 of the bushing block 14. A portion 57 of the primary layer 56 of electrically insulating material is in contact with the molten glass 23 flowing through the bore 22 of the bushing block 14 and into the bushing 24.

This primary layer 56 of electrically insulating material has a bulk density of greater than about 2.0 g/cc (33 grams per cubic inch (g/in³)), preferably has a bulk density of about 2.5 g/cc (50 g/in³) to about 6.0 g/cc (98 g/ in³) and more preferably about 3 g/cc (49 g/in³) to about 5.0 g/cc (82 g/in³). The primary layer 56 preferably has an electrical resistivity of greater than about 1000 microhm-centimeters ($\mu\Omega$-cm) and loss on ignition of less than about 6 percent by weight. More preferably, the primary layer 56 has an electrical resistivity of greater than about 5000 $\mu\Omega$-cm and loss on ignition of less than about 1 percent by weight. As used herein, "loss on ignition" means the ratio of the weight lost by a material after heating at about 500° C. for about 30 minutes to the initial weight of the material before heating, expressed as a percentage.

The primary layer 56 of electrically insulating material preferably comprises one or more metal oxides, one or more metal nitrides, or mixtures or combinations thereof. Non-limiting examples of suitable metal oxides include: zirconium oxide, yttrium oxide, calcium oxide, titanium oxide, aluminum oxide, silicon oxide, mullite, and combinations and mixtures thereof. Non-limiting examples of suitable metal nitrides include: boron nitride, titanium nitride, and combinations and mixtures thereof. Preferably, the electrically insulating material comprises zirconium oxide that is at least partially stabilized, most preferably with yttrium oxide. As used herein, "at least partially stabilized" means that the crystal structure of the zirconium oxide has been modified by the addition of yttrium oxide or other suitable oxides such as calcium oxide, such that at least a portion of the crystal structure retains its cubic structure, which is normally stable only at elevated temperatures, at room temperature. See R. Stevens "Engineering Properties of Zirconia", *Engineered Materials Handbook: Ceramics and Glasses*, Vol. 4, 1991 at pages 775–786, which are hereby incorporated by reference.

Preferably the primary layer 56 is essentially free of materials containing aluminosilicate fibers, such as FIBERFRAX low bulk density, insulating materials. As used herein, "essentially free of aluminosilicate fibers" means that the primary layer preferably contains less than about 10 weight percent aluminosilicate fibers. More preferably, the primary layer 56 contains less than about 5 weight percent of aluminosilicate fibers and is most preferably free of aluminosilicate fibers.

Figure 4:
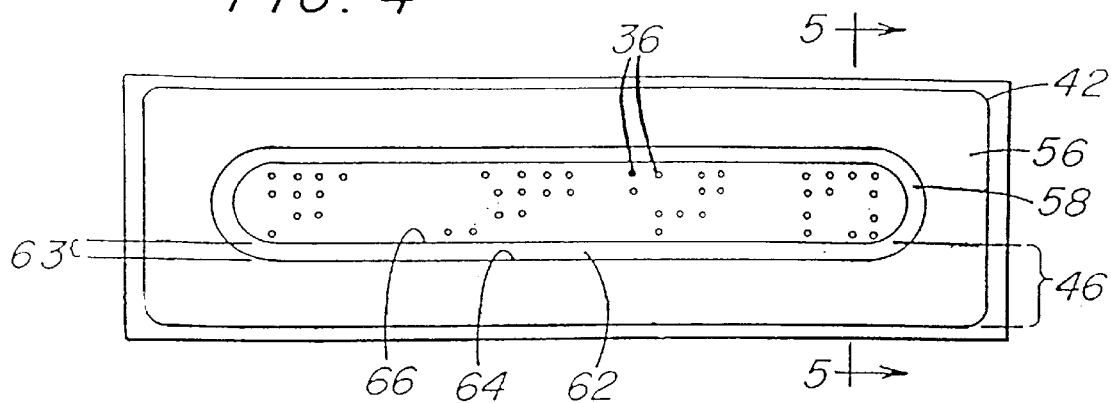
FIG. 4 is a top plan view of a bushing according to the present invention.

Referring to FIGS. 2a and 4, the thickness 60 of the primary layer 56 of electrically insulating material can range from about 0.05 mm (0.002 inches) to about 0.5 mm (0.020 inches) and preferably ranges from about 0.08 mm (0.003 inches) to about 0.25 mm (0.010 inches). The primary layer 56 of electrically insulating material is preferably deposited upon the flange 42 such that a small portion 62 or gap between the inside edge 64 of the primary layer 56 of electrically insulating material and the inner edge 66 of the flange 42 of the bushing 24 is not covered with the electrically insulating material. The width 63 of portion 62 can range from about 1.5 mm (0.60 inches) to about 8.0 mm (0.312 inches).

Since both the flange 42 and the liner 26 are malleable and the primary layer 56 is thin, the flange 42 and the liner 26 can be closely mated by applying pressure to the lower surface 78 (shown in FIG. 5) of the flange 42 opposite the primary layer 56. Conventional low bulk density, fibrous, electrically insulating materials are not desirable because thick layers must be used to prevent electrical contact between the flange 42 and irregularities 70 on the surface of the liner 26, as discussed in detail above. In the present invention, the primary layer 56 of electrically insulating material is able to resist penetration of liner surface irregularities 70 due to its high bulk density and good structural integrity.

The primary layer 56 of electrically insulating material can be applied to the upper surface 58 of the flange 42 of the bushing 24 by any method known to those skilled in the art that will provide a bond to the flange 42. As used herein "bonded" means that the primary layer 56 of electrically insulating material is adhered to at least a portion 59 of the upper surface 58 of the flange 42 of the bushing 24 by adhesive bonding, chemical bonding, electrostatic bonding or mechanical bonding to the upper surface 58. Non-limiting examples of useful methods for bonding the primary layer 56 to the flange 42 include: electrostatic coating; powder coating; dip coating; sputtering; chemical vapor deposition; electrochemical techniques such as plating; chemical techniques such as conversion coating; or molten particle deposition such as plasma spray or flame spray deposition, which is preferred.

In molten particle deposition, molten particles of the electrically insulating material are formed by injecting or aspirating a powder of the electrically insulating material into a high temperature flame (known as "flame-spraying") or plasma (known as "plasma-spraying") where it is melted. The molten particles of electrically insulating material are then sprayed onto the surface to be coated. Non-limiting examples of molten particle deposition equipment that are suitable for use in the present invention are METCO Types 7MB, 9MB, 10MB, 11MB, and MBN Plasma Spray Equipment, commercially available from Metco of Westbury, N.Y. Suitable techniques for plasma spraying are well known to those skilled in the art. If more information on plasma spraying is desired see Richerson at pages 254–256, which are hereby incorporated by reference.

The upper surface 58 of the flange 42 of the bushing 24 can require preparation by cleaning and/or preheating prior to applying the primary layer 56 of electrically insulating material. Cleaning can be done by any method well known to those skilled in the art, including: sand blasting, solvent cleaning and grit blasting, which is preferred. A non-limiting example of a suitable grit blasting media is high purity alumina grit. The flange 42 is preferably preheated to a temperature of about 260° C. (500° F.) to about 540° C. (1000° F.) using a plasma spray gun by sweeping the plasma spray over the surface of the flange 42 for about 5 seconds to about 10 seconds prior to applying the primary layer 56.

Areas of the bushing 24 that are not to be coated can be masked prior to coating. For example, masking the bushing tips 36 is desirable to prevent clogging of the tips 36. If the coating material partially or completely clogs the bushing tips 36, free flow of the molten glass 23 through the tips 36 will be impeded and the fiber forming process will be disrupted or halted. The bushing tips 36 can be masked by any method well known to those skilled in the art. For example, the tips 36 can be masked by covering with a temperature resistant tape, such as Fiberglass Thermal Spray Masking Tape #23809 (commercially available from Fluorocarbon, T&F Division of Rolling Meadows, Ill.), or by placing a metal lid or cover over the tips 36, which is preferred.

Additionally, after application of the primary layer 56 of electrically insulating material, the bushing 24 can be heat treated or annealed to relieve any residual stress imparted during the coating process. The coated bushing 24 can be heated to a temperature of about 980° C. (1800° F.) to about 1230° C. (2250° F.) for about 30 minute to about 60 minutes to anneal the bushing 24. One skilled in the art would understand that the time and temperature for annealing the bushing 24 can vary depending upon such factors as the type of electrically conductive material from which the bushing 24 is formed and the manner and conditions under which the primary layer 56 of electrically insulating material is applied. Also, one skilled in the art would understand that a change in the crystallographic structure of the primary layer 56 of electrically insulating material can occur during the annealing process. Although annealing the bushing 24 after the application of the primary layer 56 of electrically insulating material is not preferred, the bushing 24 can be annealed after coating if desired.

Referring to FIGS. 3 and 3a, there is shown an alternative embodiment of the present invention in which one or more secondary layers 355 of electrically insulating materials can be positioned between (1) the primary layer 356 of electrically insulating material opposite the flange 342 and (2) the liner 326 on the lower surface 318 of the body 315 of the bushing block 314. The secondary layer(s) 355 can be bonded to the primary layer 356 of electrically insulating material opposite the flange 342 if desired. Multiple secondary layers 355 of the same or different electrically insulating materials discussed above can be used in accordance with the present invention. For example, a primary layer 356 of zirconium oxide stabilized with yttrium oxide and a secondary layer 355 of FIBERFRAX insulating material can be used.

Also, multiple secondary layers 355 having the same or different bulk density can be used in accordance with the present invention. For example, high bulk density materials, such as plasma-sprayed coatings of METCO 240NS yttrium oxide-stabilized zirconium oxide (discussed above), low bulk density materials, (such as the FIBERFRAX materials discussed below) or combinations of high and low bulk density materials can be used to form one or more secondary layers 355. Non-limiting examples of low bulk density materials suitable for use as a secondary layer 355 of electrically insulating material include FIBERFRAX materials such as: FIBERFRAX DURABOARD™ 60 insulating material[1], having a bulk density of 0.96 g/cc (960 kg/m$^3$); FIBERFRAX DURABOARD™ LD insulating material [2], having a bulk density of 0.24–0.29 g/cc (240–289 kg/m$^3$); FIBERFRAX DURABOARD™ HD insulating material [3], having a bulk density of 0.39–0.45 g/cc (385–449 kg/m$^3$); FIBERFRAX DURABOARD™ 2600 insulating material [4], having a bulk density of 0.19–0.22 g/cc (192–224 kg/m$^3$); and FIBERFRAX 970 J insulating material [5], having a bulk density of 0.16 to 0.19 g/cc (160–192 kg/m$^3$). While the secondary layer 355 of electrically insulating material can comprise aluminosilicate fibers, such as the FIBERFRAX insulating material discussed above, preferably the secondary layer 355 is essentially free of aluminosilicate fibers and more preferably is free of aluminosilicate fibers, as defined above.

[1]"FIBERFRAX DURABOARD™ 60 Product Specification", Form C739-F, 1981, available from The Carborundum Company of Niagara Falls, N.Y., which is hereby incorporated by reference. [2]"FIBERFRAX DURABOARD™ LD Product Specification", Form C739-D, 1980, available from The Carborundum Company of Niagara Falls, N.Y., which is hereby incorporated by reference. [3]"Principal Characteristics of Fiberfrax Products", Form C732-B, 1981, p. 4, available from The Carborundum Company of Niagara Falls, N.Y., which is hereby incorporated by reference. [4]"FIBERFRAX DURABOARD™ 2600 Product Specification", Form C-739G, 1982, available from The Carborundum Company of Niagara Falls, N.Y., which is hereby incorporated by reference. [5]"Principal Characteristics of Fiberfrax Products" Form C732-B, 1981, p. 3 available from The Carborundum Company of Niagara Falls, N.Y.

Also, one or more layers 374 of electrically insulating material having a bulk density greater than about 2.0 g/cc can be bonded to a portion 325 of the liner 326 on the lower surface 318 of the body 315 of the bushing block 314 in lieu of or in addition to the primary layer 356 of electrically insulating material bonded to the upper surface 358 of the flange 342 and/or the secondary layer(s) 355 of electrically insulating material. The layer 374 of electrically insulating material can be formed from the same materials that form the primary layer 56 of electrically insulating material, as discussed in detail above.

Referring to FIG. 5, an electrically insulating material 74 also can be bonded to a portion 77 of an external surface 76 of the sidewall 38 of the bushing 24 and a portion 79 of a lower surface 78 of the flange 42 of the bushing 24 in addition to the primary layer 56 of electrically insulating material bonded to the upper surface 58 of the flange 42. This electrically insulating material 74 preferably has the same chemical composition and bulk density as the primary layer 56 of electrically insulating material, although it can have a different chemical composition and/or bulk density. Examples of useful electrically insulating materials include the electrically insulating materials discussed in detail above for the primary layer 56.

Referring to FIG. 7, a refractory insulating material 80 encases the external surface 73 of the electrically insulating material 74, the external surface 76 of the sidewall 38 of the bushing 24 and the lower surface 78 of the flange 42 of the bushing 24. The refractory insulating material 80 helps maintain the correct temperature of the bushing 24 during use. The refractory insulating material 80 is preferably cast from an aluminate- or a silicate-based cement material such as calcium aluminate, calcium silicate, barium silicate, and barium aluminate; however, other castable refractory cements, such as phosphate cements, can be used. A non-limiting example of a suitable castable refractory material is HW Lightweight Castable 30, a calcium aluminate cement commercially available from Harbison-Walker Refractories of Pittsburgh, Pa. For more information on other suitable refractory cement materials, see Richerson at pages 256–258, which are hereby incorporated by reference.

Referring now also to FIG. 2, a metal cooling tube or loop 82 is embedded in the refractory insulating material 80 and in contact with the lower surface 78 of the flange 42. Water is circulated through the cooling loop 82 to solidify any molten glass 23 that has penetrated into the gap 48 between the flange 42 and the liner 26 to prevent leaking of the molten glass 23 from the bushing assembly 11. One skilled in the art would understand that the configuration and position of the cooling loop 82 will depend in part upon the bushing configuration and operating conditions.

The bushing 24 having the refractory insulating material 80 encasing the external surface 73 of the electrically insulating material 74, the external surface 76 of the sidewall 38 of the bushing 24 and the lower surface 78 of the flange 42 of the bushing 24 is mounted into a metal frame 84. The frame 84 is used to position the bushing 24 adjacent to the bushing block 14 by clamping or by other suitable mounting means (not shown for clarity in the drawings) which are well known to those skilled in the art. The frame 84 also supports the bushing 24 and prevents sagging of the bushing 24. For further discussion of bushing construction and assembly, see *Loewenstein* (3rd. Ed. 1993) at pages 135–141, which are hereby incorporated by reference.

Referring to FIG. 7, a layer 81 of a thermal insulating material is preferably positioned between the refractory insulating material 80 and the frame 84 to accommodate thermal expansion of the bushing 24 during use. The layer 81 can be formed from any low bulk density, thermal insulating material, such as FIBERFRAX 970 J insulating material, discussed above.

The operation of a fiber forming apparatus 10 including the bushing assembly 11 of the present invention will now be discussed generally. Referring to FIG. 1, a supply of molten glass 23 flows from the furnace through the forehearth 12, the bore 22 of the bushing block 14 and into the heated bushing 24. The molten glass 23 is then attenuated or drawn through the bushing tips 36 into fibers 50 by an attenuation device 86 discussed below.

After the fibers 50 are drawn through the bushing tips 36 but before winding, a "sizing" composition can be applied to the surface of the fibers 50 by an applicator 94. As used herein, "sizing" or "size" refers to a coating composition applied to the fibers 50 immediately after forming. Such compositions are well known to those skilled in the art and are disclosed in *Loewenstein*, (3rd. Ed. 1993) at Chapter 6, which is hereby incorporated by reference. The size can be applied in many ways, for example by contacting the fibers 50 with a static or dynamic applicator, such as a roller or a belt applicator, spraying or other means that as are well known to those skilled in the art. After the size is applied, the fibers 50 are gathered together by an alignment device 96 such as rotatable or stationary gathering shoes or a comb. For more information on applicators and alignment devices see *Loewenstein*, (3rd Ed. 1993) at pages 172–177, which are hereby incorporated by reference.

After the fibers are gathered into a bundle, they are wound into a package 85 by the attenuation device 86. A non-limiting example of a suitable attenuation device 86, as shown in FIG. 1, is a winder 88 comprising a rotatable collet 90 mounted upon a support or shaft 92 and a motor assembly (not shown) for rotating the collet. For more information on suitable winding equipment see *Loewenstein*, (3rd. Ed. 1993) at pages 175–194, which are hereby incorporated by reference.

A method of electrically insulating an electrically conductive bushing 24 from an electrically conductive liner 26 of a bushing block 15 according to the present invention will now be discussed generally. Referring to FIGS. 1, 2 and 2a, the method of electrically insulating the bushing 24 from the liner 26 includes an initial the step of providing a bushing block 15 having an insulating body 14 with an internal bore 22 and an electrically conductive liner 26 positioned upon an inner surface 25 of the bore 22, a portion 27 of an upper surface 16 of the body 14 adjacent the bore 22, and a portion 29 of a lower surface 18 of the body 14 adjacent the bore 22. The bushing block 15 is positioned such that the bore 22 is aligned with an opening 13 in the floor 20 of the forehearth 12 to receive the molten glass 23.

An electrically conductive bushing 24 having a primary layer 56 of electrically insulating material bonded to a portion 59 of the upper surface 58 of a flange 42 is provided to receive the molten glass 23 from the bore 22. The bushing 24 is positioned adjacent to the bushing block 15 such that the primary layer 56 of electrically insulating material bonded to the flange 42 is: (i) in facing engagement with the electrically conductive liner 26 on the lower surface 18 of the body 14 of the bushing block 15 to electrically insulate the bushing 24 from the liner 26; and (ii) in contact with the molten glass 23.

The present invention will now be illustrated by the following specific, non-limiting example.

EXAMPLE

Two bushings, one for forming G-75 fibers (Bushing "A") and one for forming DE-150 fibers (Bushing "B"), were fabricated from a platinum-rhodium alloy. Both bushings were grit blasted using a high purity, 90 grit alumina at a pressure of about 40 pounds per square inch (psi), washed with a mild soap and preheated for about 5 seconds to about 10 seconds to a temperature of about 370° C. (700° F.) using a plasma-gun. Bushing A was plasma sprayed with a layer of electrically insulating material (METCO 204NS yttrium oxide-stabilized zirconium oxide) ranging in thickness from about 0.13 mm (0.005 inches) to about 0.25 mm (0.010 inches) on the exterior surfaces of the sidewalls, the lower surface of the flange, and the upper surface of the flange to bond the electrically insulating material thereto, in accordance with the present invention. The layer of electrically insulating material had a bulk density greater than about 2.0 g/cc[1].

[1]"TECH-REPORT Metco 204NS Yttria Stabilized Zirconia Powder" (Jul. 1, 1985), Metco of Westbury, N.Y., which is hereby incorporated by reference.

Bushing B was plasma sprayed with a layer of METCO 204NS yttrium oxide-stabilized zirconium oxide ranging in thickness from about a 0.13 mm (0.005 inches) to about 0.25 mm (0.010 inches) on only the exterior surfaces of the sidewalls and the lower surface of the flange. The METCO 204NS yttrium oxide-stabilized zirconium oxide was not applied to the upper surface of the flange of Bushing B.

Bushing A was installed such that the yttrium oxide-stabilized zirconium oxide layer bonded to the upper surface of the flange was in facing engagement with the platinum-rhodium alloy liner on the lower surface of the bushing block. No additional layers of electrically insulating material were disposed between the flange of the bushing and the liner of the bushing block. The bushing was heated to a temperature of about 1150° C. (2130° F.) and used to produce fibers for 34 days with essentially no degradation of the coating and no electrical failures or glass leakage.

Bushing B was installed such that the upper surface of the flange of the bushing was adjacent to the platinum-rhodium liner on the lower surface of the bushing block. A single layer of low bulk density, aluminosilicate fiber containing insulating material (FIBERFRAX 970 J) was disposed between the uncoated flange and the liner on the lower surface of the bushing block to electrically isolate the bushing from the bushing block. The bulk density of the FIBERFRAX 970 J insulating material was about 0.16 to 0.19 g/cc (160–192 kg/m$^3$)[1] and the thickness of the layer was about 2.5 mm (0.100 inches). The bushing was heated to a temperature of about 1218° C. (2250° F.) and used to produce fibers for 2 days before electrical failure. Overheating of the bushing in the area of electrical contact between the flange and the liner surface irregularities and leakage of glass from between the flange and liner was observed.

[1]"Principal Characteristics of Fiberfrax Products" Form C732-B, 1981, p. 3, The Carborundum Company of Niagara Falls, N.Y.

The foregoing example illustrates advantages of the bushing assembly of the present invention. As shown by the example, the high bulk density, electrically insulating layer bonded to the upper surface of the flange of the bushing in the bushing assembly of the present invention has improved structural integrity and erosion resistance compared to FIBERFRAX 970 J aluminosilicate fiber-containing, insulating material which has a low bulk density and was not bonded to the flange. The bushing assembly of the present invention is advantageous in fiber forming operations contributing to increased bushing longevity, lower maintenance cost, decreased maintenance time, and lower bushing replacement costs as compared to conventional bushing assemblies using aluminosilicate fiber-containing insulation materials. The bushing assembly and fiber forming apparatus of the present invention also provide for improved fiber quality and production efficiency in the fiber forming operation.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention as defined by the appended claims.

Therefore, I claim:

1. A bushing assembly for forming fibers from a supply of molten fiberizable material, the bushing assembly comprising:

(a) a bushing block comprising: (i) an insulating body having an upper surface, a lower surface, and a bore extending between a portion of the upper surface and a portion of the lower surface to define a passageway through the bushing block between the upper surface and the lower surface to permit the flow therethrough of a molten fiberizable material received from a supply; and (ii) an electrically conductive liner positioned upon a surface of the bore, a portion of the upper surface of the body adjacent to the bore, and a portion of the lower surface of the body adjacent to the bore; and (b) an electrically conductive bushing positioned adjacent to the lower surface of the body of the bushing block to receive the molten fiberizable material from the bore of the bushing block, the bushing comprising:

(i) a bottom wall having a plurality of apertures to permit the flow therethrough of the molten fiberizable material;

(ii) a sidewall extending upwardly from an edge of the bottom wall; and (iii) a flange extending generally perpendicularly from a top edge of the sidewall, a portion of an upper surface of the flange having a primary layer of an electrically insulating material bonded thereto, the bushing being positioned adjacent to the bushing block such that the layer of electrically insulating material bonded to the upper surface of the flange is positioned adjacent to the liner on the lower surface of the body of the bushing block and is in contact with the molten fiberizable material, the primary layer of electrically insulating material having a bulk density greater than about 2.0 grams per cubic centimeter and being essentially free of aluminosilicate fibers.

2. The bushing assembly according to claim 1, further comprising a secondary layer of electrically insulating material positioned between the liner on the bottom surface of the body of the bushing block and the primary layer of the electrically insulating material bonded to the flange of the bushing.

3. The bushing assembly according to claim 2, wherein the secondary layer of electrically insulating material has a bulk density of less than about 1.0 grams per cubic centimeter.

4. The bushing assembly according to claim 2, wherein the secondary layer of electrically insulating material has a bulk density of greater than about 2.0 grams per cubic centimeter.

5. The bushing assembly according to claim 2, wherein the secondary layer of electrically insulating material is bonded to the primary layer of electrically insulating material opposite the flange.

6. The bushing assembly according to claim 2, wherein the secondary layer of electrically insulating material is essentially free of aluminosilicate fibers.

7. The bushing assembly according to claim 6, wherein the secondary layer of electrically insulating material is free of aluminosilicate fibers.

8. The bushing assembly according to claim 1, wherein the insulating body of the bushing block comprises a refractory ceramic material.

9. The bushing assembly according to claim 1, wherein the liner of the bushing block comprises a platinum-containing material.

10. The bushing assembly according to claim 1, wherein the bushing comprises a platinum-containing material.

11. The bushing assembly according to claim 1, wherein the primary layer of electrically insulating material bonded to the upper surface of the flange of the bushing is selected from the group consisting of oxides, metal nitrides and mixtures thereof.

12. The bushing assembly according to claim 11, wherein the primary layer of electrically insulating material bonded to the upper surface of the flange of the bushing is an oxide selected from the group consisting of zirconium oxide, yttrium oxide, calcium oxide, titanium oxide, aluminum oxide, silicon oxide and combinations and mixtures thereof.

13. The bushing assembly according to claim 12, wherein the oxide is zirconium oxide which is at least partially stabilized with a stabilizing oxide.

14. The bushing assembly according to claim 13, wherein the stabilizing oxide is yttrium oxide.

15. The bushing assembly according to claim 1, wherein a thickness of the primary layer of electrically insulating material bonded to the upper surface of the flange of the bushing ranges from about 0.05 millimeters to about 0.5 millimeters.

16. The bushing assembly according to claim 15, wherein the thickness of the primary layer ranges from about 0.08 millimeters to about 0.25 millimeters.

17. The bushing assembly according to claim 1, wherein the primary layer of electrically insulating material is bonded to the upper surface of the flange of the bushing by molten particle deposition.

18. The bushing assembly according to claim 1, wherein the primary layer of electrically insulating material bonded to the flange is in facing engagement with the electrically conductive liner on the lower surface of the body of the bushing block.

19. The bushing assembly according to claim 1, further comprising a layer of an electrically insulating material bonded to a portion of the liner on the lower surface of the bushing block.

20. A bushing assembly for forming fibers from a supply of molten fiberizable material, the bushing assembly comprising:

(a) a bushing block comprising: (i) an electrically insulating body having an upper surface, a lower surface, and a bore extending between a portion of the upper surface and a portion of the lower surface to define a passageway through the bushing block between the upper surface and the lower surface to permit the flow therethrough of a molten fiberizable material received from a supply; and (ii) an electrically conductive liner positioned upon a surface of the bore, a portion of the upper surface of the body adjacent to the bore, and a portion of the lower surface of the body adjacent to the bore; and (b) an electrically conductive bushing positioned adjacent to the lower surface of the body of the bushing block to receive the molten fiberizable material from the bore of the bushing block, the bushing comprising:

(i) a bottom wall having a plurality of apertures to permit the flow therethrough of the molten fiberizable material;

(ii) a sidewall extending upwardly from a edge of the bottom wall; and (iii) a flange extending generally perpendicularly from a top edge of the sidewall, a portion of an upper surface of the flange having a primary layer of an electrically insulating material bonded thereto, the bushing being positioned adjacent to the bushing block such that the layer of electrically insulating material bonded to the upper surface of the flange is positioned adjacent to the liner on the lower surface of the body of the bushing block and is in contact with the molten fiberizable material, the primary layer of electrically insulating material having a bulk density of greater than about 2.0 grams per cubic centimeter and comprising zirconium oxide which is at least partially stabilized with yttrium oxide, the primary layer being free of aluminosilicate fibers.

21. A fiber forming apparatus comprising:

(a) a supply of molten fiberizable material;

(b) a bushing assembly positioned to received a molten fiberizable material from the supply, the bushing assembly comprising:

(i) a bushing block comprising: (1) an insulating body having an upper surface, a lower surface, and a bore extending between a portion of the upper surface and a portion of the lower surface to define a passageway through the bushing block between the upper surface and the lower surface to permit the flow therethrough of the molten fiberizable material received from the supply; and (2) an electrically conductive liner positioned upon a surface of the bore, a portion of the upper surface of the body adjacent to the bore, and a portion of the lower surface of the body adjacent to the bore; and (ii) an electrically conductive bushing positioned adjacent to the lower surface of the body of the bushing block to receive the molten fiberizable material from the bore of the bushing block, the bushing comprising:

(1) a bottom wall having a plurality of apertures to permit the flow therethrough of the molten fiberizable material;

(2) a sidewall extending upwardly from a edge of the bottom wall; and (3) a flange extending generally perpendicularly from a top edge of the sidewall, a portion of an upper surface of the flange having a primary layer of an electrically insulating material bonded thereto, the bushing being positioned adjacent to the bushing block such that the primary layer of electrically insulating material bonded to the upper surface of the flange is positioned adjacent to the liner on the lower surface of the body of the bushing block and is in contact with the molten fiberizable material, the primary layer of electrically insulating material having a bulk density of greater than about 2.0 grams per cubic centimeter, the primary layer being essentially free of aluminosilicate fibers; and (c) a device positioned below the bushing for attenuating the fiberizable material through the plurality of apertures on the bottom wall of the bushing to form continuous fibers from the molten fiberizable material.

* * * * *